(12) United States Patent
Rust et al.

(10) Patent No.: US 6,532,121 B1
(45) Date of Patent: Mar. 11, 2003

(54) COMPRESSION ALGORITHM WITH EMBEDDED META-DATA FOR PARTIAL RECORD OPERATION AUGMENTED WITH EXPANSION JOINTS

(75) Inventors: Robert A. Rust, Boise, ID (US); Douglas L. Voigt, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/426,831

(22) Filed: Oct. 25, 1999

(51) Int. Cl.⁷ .................................................. G11B 5/00
(52) U.S. Cl. ........................... 360/8; 360/48; 711/111; 711/114; 710/68; 707/101
(58) Field of Search ................ 360/8, 48; 711/111–114, 711/154; 710/68; 707/101

(56) References Cited

U.S. PATENT DOCUMENTS

| | | | | |
|---|---|---|---|---|
| 5,481,701 A | * | 1/1996 | Chambers, IV | 707/101 |
| 5,623,701 A | * | 4/1997 | Bakke et al. | 710/68 |
| 5,630,092 A | * | 5/1997 | Carreiro et al. | 711/111 |
| 5,644,791 A | * | 7/1997 | Brady et al. | 710/68 |
| 5,649,151 A | * | 7/1997 | Chu et al. | 711/111 |
| 5,875,270 A | * | 2/1999 | Nakamura | 382/232 |
| 6,134,062 A | * | 10/2000 | Blumenau | 360/48 |

FOREIGN PATENT DOCUMENTS

| | | |
|---|---|---|
| EP | 0913760 A1 | 6/1999 |
| EP | 0913761 A1 | 6/1999 |
| EP | 0913762 A1 | 6/1999 |
| EP | 0913825 A2 | 6/1999 |
| EP | 0915413 A1 | 12/1999 |

* cited by examiner

Primary Examiner—David Hudspeth
Assistant Examiner—Dan I. Davidson
(74) Attorney, Agent, or Firm—Anthony J Baca

(57) ABSTRACT

A compression system stores meta-data in the compressed record to allow better access and manage merging data. Markers are added to the compression stream to indicate various things. Each compressed record has a marker to indicate the start of the compressed data. These markers have sector number as well as the relocation block numbers embedded in their data. A second marker is used to indicate free space. When compressed data is stored on the disk drive, free space is reserved so that future compression of the same, or modified, data has the ability to expand slightly without causing the data to be written to a different location. Also the compressed data can shrink and the remaining space can be filled in with this free space marker. A third type of marker is the format pattern marker. Compression algorithms generally compress the format pattern very tightly. However, the expectation is that the host will write useful data to the storage device. The compressor is fed typical data in the region of the format pattern, but a marker is set in front of this data to allow the format pattern to be returned rather than the typical data.

13 Claims, 10 Drawing Sheets

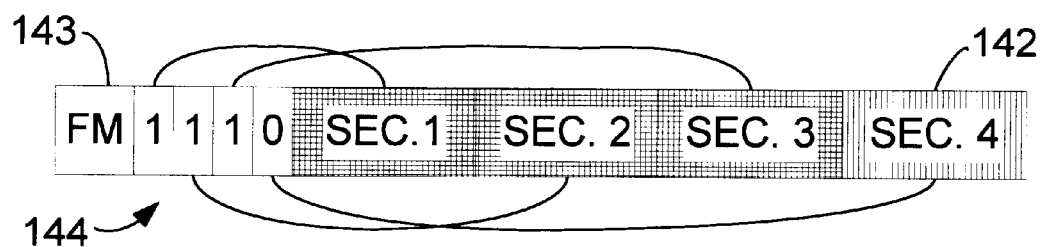
FIG. 9
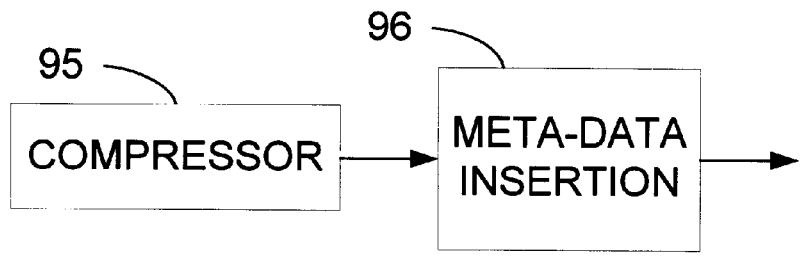
FIG. 10
| D | D | D | D | D |
|---|---|---|---|---|
| D | M | M | D | D |
| D | D | F | F | F |
| F | F | D | D | D |
FIG. 11

| D | D | D | D | D |
|---|---|---|---|---|
| D | M | M | D | D |
| D | M' | I | F | F |
| F | F | D | D | D |

FIG. 12

COMPRESSION ALGORITHM WITH EMBEDDED META-DATA FOR PARTIAL RECORD OPERATION AUGMENTED WITH EXPANSION JOINTS

TECHNICAL FIELD

The present invention relates to data compression and more particularly to embedding meta-data in a compression stream.

BACKGROUND OF THE INVENTION

Data compression systems are known in the prior art that encode a stream of digital data signals into compressed digital code signals and decode the compressed digital code signals back into the original data. Data compression refers to any process that attempts to convert data in a given format into an alternative format requiring less space than the original. The objective of data compression systems is to effect a savings in the amount of storage required to hold or the amount of time required to transmit a given body of digital information.

To be of practical utility, a general purpose digital data compression system should satisfy certain criteria. The system should have reciprocity. In order for a data compression system to possess the property of reciprocity it must be possible to re-expand or decode the compressed data back into its original form without any alteration or loss of information. The decoded and original data must be identical and indistinguishable with respect to each other. The property of reciprocity is synonymous to that of strict noiselessness used in information theory. Some applications do not require strict adherence to the property of reciprocity. One such application in particular is when dealing with graphical data. Because the human eye is not that sensitive to noise, some alteration or loss of information during the compression de-compression process is acceptable.

The system should provide sufficient performance with respect to the data rates provided by and accepted by the devices with which the data compression and de-compression systems are communicating. The rate at which data can be compressed is determined by the input data processing rate into the compression system, typically in millions of bytes per second (megabytes/sec). Sufficient performance is necessary to maintain the data rates achieved in present day disk, tape and communication systems which rates typically exceed one megabyte/sec. Thus, the data compression and de-compression system must have enough data bandwidth so as to not adversely affect the overall system. The performance of data compression and de-compression systems is typically limited by the computations necessary to compress and de-compress and the speed of the system components such as, random access memory (RAM), and the like, utilized to store statistical data and guide the compression and de-compression process. Performance for a compression device is characterized by the number of processor cycles required per input character under the compressor. The fewer the number of cycles, the higher the performance.

Another important criteria in the design of data compression and decompression systems is compression effectiveness, which is characterized by the compression ratio. The compression ratio is the ratio of data size in uncompressed form divided by the size in compressed form. In order for data to be compressible, the data must contain redundancy. Compression effectiveness is determined by how effectively the compression procedure uses the redundancy in the input data. In typical computer stored data, redundancy occurs both in the nonuniform usage of individual symbology, example digits, bytes, or characters, and in frequent recurrence of symbol sequences, such as common words, blank record fields and the like.

General purpose data compression procedures are also known in the prior art, three relevant procedures being the Huffman method, the Tunstall method and the Lempel-Ziv method. The Huffman method is widely known and used, reference thereto in article of D. A. Huffman entitled "A Method For Construction Of Minimum Redundancy Codes", Proceedings IRE, 40, 10 pages 1098–1100 (September 1952). Reference to the Tunstall algorithm may be found in Doctoral thesis of B. P. Tunstall entitled "Synthesis of Noiseless Compression Codes", Georgia Institute of Technology (September 1967). Reference may be had to the Lempel-Ziv procedure in a paper authored by J. Ziv and A. Lempel entitled "A Universal Algorithm For Sequential Data Compression", IEEE Transactions on Information Theory, IT-23, 3, pages 337–343 (May, 1977).

Redundant arrays of inexpensive or independent data storage devices (RAID) are being employed by the mass storage industry to provide variable capacity data storage. RAID systems use interconnected disk drives to achieve the desired capacity of mass storage. With this approach, a disk drive of one capacity may be manufactured and packaged with the same or different capacity drives to provide the required storage capacity. RAID systems eliminate the need to manufacture disk drives individually designed to meet specific storage requirements. Each disk drive in a RAID system is usually housed in an individual module for handling and installation. The modules slide into and out of a larger enclosure that houses the array of disk drives and provides the sockets, plug-ins and other connections for the electrical interconnection of the drives. Controllers orchestrate the interconnection and control access to selected disk drives for data reading and writing operations.

A RAID system is an organization of data in an array of data storage devices, such as hard disk drives, to achieve varying levels of data availability and system performance. Data availability refers to the ability of the RAID system to provide data stored in the array of data storage devices even in the event of the failure of one or more of the individual data storage devices in the array. A measurement of system performance is the rate at which data can be sent to or received from the RAID system.

Of the five basic architectures developed for RAID systems, RAID 1 and RAID 5 architectures are most commonly used. A RAID 1 architecture involves an array having a first set of data storage devices with a second set of data storage devices which duplicates the data on the first set. In the event of the failure of a data storage device, the information is available from the duplicate device. The obvious drawback of this RAID system implementation is the necessity of doubling the storage space.

A RAID 5 architecture provides for redundancy of data by generating parity data. Each of the data storage devices are segmented into a plurality of units of data, known as blocks, containing equal numbers of data words. Blocks from each data storage device in the array covering the same data storage device address range form what are referred to as "stripes". A parity block is associated with each stripe. The parity block is generated by performing successive exclusive OR operations between corresponding data words in each of the data blocks. Changes to data blocks in a stripe necessitates re-computation of the parity block associated with the stripe. In a RAID 4 system, all parity blocks are stored on a single unit in the array. As a result, the data storage device containing the parity blocks is accessed disproportionately relative to the other data storage devices in the array. To eliminate the resulting constriction of data flow in a RAID 4 system, a RAID 5 architecture distributes the parity blocks across all of the data storage devices in the array. Typically in a RAID 5 system, a set of N+1 data storage devices forms the array. Each stripe has N blocks of data and one block of parity data. The block of parity data is stored in one of the N+1 data storage devices. The parity blocks corresponding to the remaining stripes of the RAID system are stored across the data storage devices in the array. For example, in a RAID 5 system using five data storage devices, the parity block for the first stripe of blocks may be written to the fifth device; the parity block for the second stripe of blocks may be written to the fourth drive; the parity block for the third stripe of blocks may be written to the third drive; etc. Typically, the location of the parity block in the array for succeeding blocks shifts to the succeeding logical device in the array, although other patterns may be used. More information detailing the architecture and performance of RAID systems can be found in the RAID Book: A Source Book for RAID Technology, by the RAID Advisory Board, 1993, the disclosure of which is incorporated herein by reference.

When data stored in the N+1 storage devices of the RAID 5 array is modified, the parity block for the stripe in which the data is located must also be modified. This modification process can occur through what is known as a "read-modify-write" sequence or a "write in place" sequence. In a read-modify-write sequence, the parity block is recomputed through a process of performing the exclusive OR operation between corresponding words of the data blocks forming the stripe.

A write in place sequence recomputes the parity block by removing the effect of the data currently contained in the storage locations which will be modified from the parity block and then adding the effect of the new data to the parity block. To perform a write in place sequence, the data presently stored in the data blocks having the storage locations which will be modified is read. The corresponding portion of the parity block of the stripe containing the storage locations which will be modified is read. The exclusive OR operation is performed between the data presently stored in the data blocks and the corresponding portion of the parity block to remove the effect of the presently stored data on the parity block. The exclusive OR operation is then performed between the new data and the result of the previous exclusive OR operation. This result is then stored on the data storage devices in the corresponding locations from which the portion of the parity block was loaded and the new data is stored in the stripe.

Efficiency considerations determine which one of these methods of parity block computation will be used. The factors used to determine which of these methods of parity block generation is most efficient vary with the configuration of the RAID system and the data blocks which are being modified. For example, if there are a large number of data storage devices which store portions of the stripe and changes have been made to data blocks which involve only a few of the data storage devices, the most efficient parity block re-computation method may be write in place. However, if a relatively large fraction of data storage devices are involved in the changes to the data blocks, the most efficient parity block re-computation method may be read-modify-write. The firmware controlling the operation of the RAID system determines the most efficient parity block re-computation method for each data transfer to the array.

Low cost RAID systems can be implemented by using software installed in the host computer system to perform the RAID system management functions. For this type of RAID system the host computer system manages the distribution of data blocks and parity blocks across an array of data storage devices and performs the parity block computation. As expected, this low cost RAID system implementation results in a significant reduction in the ability of the host computer system to perform its other data processing operations. High performance RAID systems use a dedicated controller to manage the data block and parity block storage in the array of data storage devices. For these high performance RAID systems, the host computer is able to interact with the RAID system as a single data storage unit.

Within the category of high performance RAID systems using controllers, there are low cost controllers and high performance controllers. Low cost controllers use the microprocessor on the controller to perform many of the data manipulation tasks. This implementation makes a trade off in the performance of the RAID system controller to reduce the cost of the controller. High performance controllers utilize dedicated hardware, such as a state machine or a dedicated microprocessor, data compression engines, to more rapidly perform many data manipulation tasks.

There are many problems that arise when attempting to compress data stored on a storage system. Perhaps one of the most significant contributors to the problems is the unpredictable compression ratio from lossless algorithms. To illustrate this issue, FIG. 1 shows several blocks 121 on the left, each of which are not compressed. The right side shows their compressed result 122.

Note that in one case (124), the compression operation actually expanded the block. This is one fundamental aspect to compressing data in a lossless fashion. The result can take more space than the original. When designing a system, this condition must be dealt with for optimal compression performance.

Now, envision each of the blocks being some set number of sectors on the disk drive or tape drive. In order to optimize the space consumed by the compressed data, the compressed blocks should be placed back to back on the disk storage regardless of the sector boundaries.

Assume that each of the uncompressed blocks represents a sector on a disk drive. There would be a total of 12 sectors used to store 12 sectors worth of data. The compressed data is stored back to back—virtually ignoring all disk sector boundaries as shown in FIG. 2. In a RAID (Redundant Array of Independent Disks) system, it actually wouldn't be out of the question to view each vertical column as a disk. The compressed image could span the boundary between two disk drives. Remember that one block that didn't compress? The one block that did not compress (124) has been stored in a different region since the uncompressed version required less disk space.

While compression ratio is maximized by storing the data in such a compact fashion, this type of organization may cause several problems. First, a compression engine as know in the art—hardware (used exclusively if performance is even a remote concern) or software—will create the compressed image. To reverse this process, a decompression engine must be given the compressed record. In fact, prior to the present invention, the decompression engine must be given the compressed record and nothing but the compressed record. That infers that there is some knowledge of the exact starting location of the compressed record. To store the byte address of each and every compressed record in the system can be costly if done in SDRAM and very slow if stored on disk.

Another problem shows up when users start to modify the data already stored on the disks. If a user modifies only a portion of the record, it is very desirable to only modify the portion of the record that was affected. The update of the data in place presents a problem when looking at traditional compression algorithms. Lossless adaptive compression algorithms will build a history of the data as the data is compressed. When information is gathered during the compression process, that information is used to improve compression of the remainder of the record. Therefore, each byte of data compressed depends on all of the previous bytes of data in the record. Given this attribute of lossless adaptive compression techniques, the modification of the compressed data record in place needs a different mode of operation.

As mentioned earlier, the compressed data records will not have a predictable compression ratio. This will present a problem for modifications that are made in place. There is nor space if the new compressed data is a little larger than the previously compressed data. If it shrinks, there is wasted space.

SUMMARY OF THE INVENTION

In order to accomplish the present invention there is provided a method for compressing data. The uncompressed data is received. A first meta-data marker is placed in the a compressed data. The first meta-data indicating the beginning of a data record. Compression of the uncompressed data is started. Compression may be by any algorithm. After a predefined amount of the uncompressed data is compressed, a second meta-data marker is inserted in the compressed data. The second meta-marker indicating the beginning of a decompressible data block. After a predefined amount of the compressed data is created, a third meta-data marker is inserted in the compressed data, where the third meta-data marker identifies an expansion joint in the compressed data. There is also a fourth meta-data marker that indicates to the decompressor that the identified data is to be ignored.

There is also provided a method to merge new data with already compressed data. First, the location of the additional data in the compressed data is estimated. Then the compressed data is searched for a second meta-data marker. The additional data is merged with the present compressed data. If the merged data requires more space than the size of the expansion joint is decreased, alternatively, if the merged data requires less space, than the size of the expansion joint is increased.

There is further provided an ignore meta-data used to instruct the decompressor that the following meta-data is actual compressed data and not metadata.

There is also provided a decompressor to decompress the compressed data and extract all meta-data. The compressed data is searched for the first meta-data marker. Starting at the first meta-data, the compressed data is decompressed by a decompression engine. If a second meta-data marker is found in the compressed data, then the decompression engine is reset. If a third meta-data marker is found in the compressed data, then the decompression engine is instructed to skip the third meta-data marker.

BRIEF DESCRIPTION OF THE DRAWINGS

A better understanding of the invention may be had from the consideration of the following detailed description taken in conjunction with the accompanying drawings in which:

FIG. 9 is a more detailed pictorial representation of a portion of data.

FIG. 10 is a high level diagram showing the typical environment of the present invention.

FIG. 11 is a representation of a small data segment that is stored on a data storage device.

FIG. 12 is a representation of a small data segment that is stored on a data storage device showing the use of a special code.

DETAILED DESCRIPTION OF THE PREFERRED EMBODIMENTS

The present invention is not limited to a specific embodiment illustrated herein. The preferred embodiment, the present invention allows the compression engine to store meta-data in the compressed record. Additionally, there are expansion joints placed to allow for a reasonable amount of data expansion. Markers are added to the compression stream to indicate various things. A first marker is the compressed record marker. Each compressed record has a marker to indicate the start of the compressed data. The storage system knows the rough location of the start of the compressed record. It starts reading in that region and scans the data for the record start marker. A second marker is used to indicate free space. When compressed data is stored on the disk drive, free space is reserved so that future compression of the same, or modified, data has the ability to expand slightly without causing the data to be written to a different location. Also the compressed data can shrink and the remaining space can be filled in with this free space marker. A third type of marker is the format pattern marker. Compression algorithms generally compress the format pattern very tightly. However, the expectation is that the host will write useful data to the storage device. The compressor is fed typical data in the region of the format pattern, but a marker is set in front of this data to allow the format pattern to be returned rather than the typical data.

Figure 1:
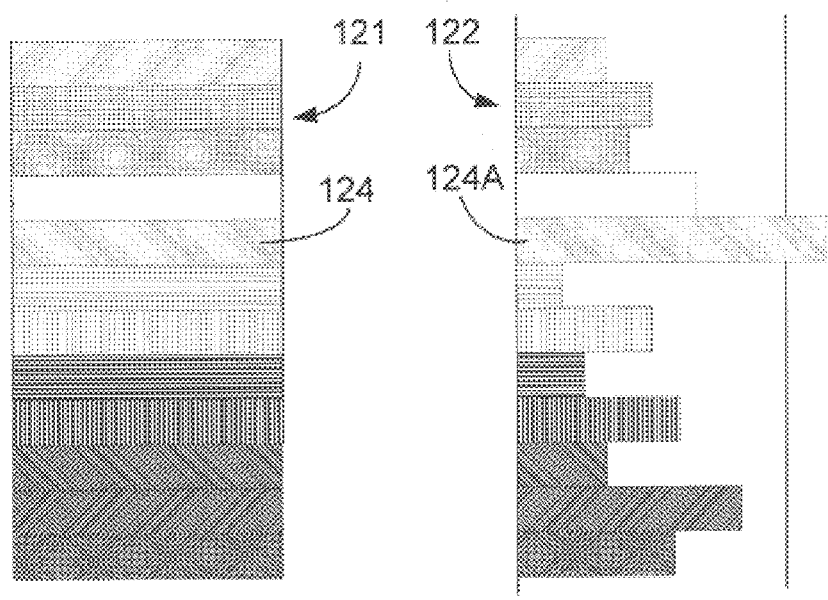
FIG. 1 shows a typical data record and the resulting data record after data compression.
Figure 2:
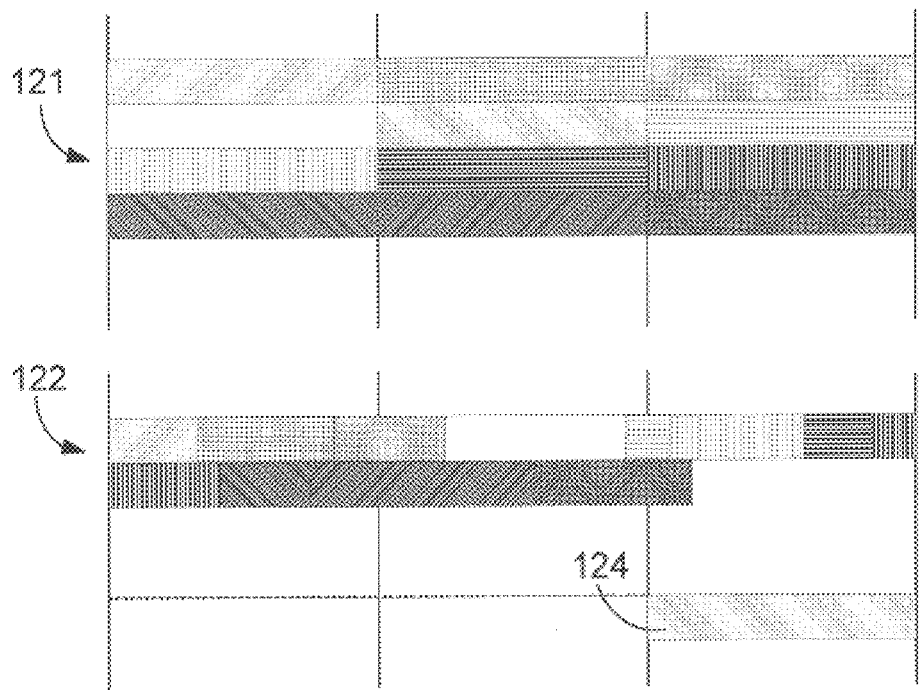
FIG. 2 shows how the data records of FIG. 1 might be stored on a storage device.
Figure 3:
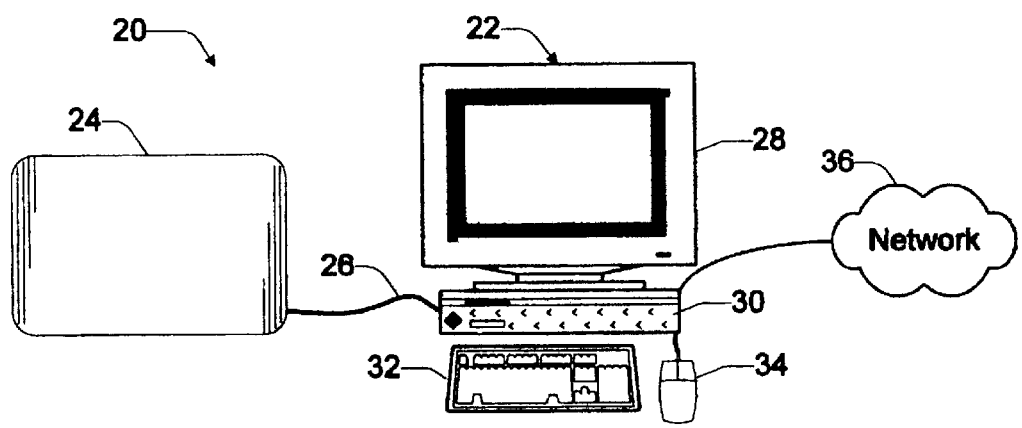
FIG. 3 is a diagrammatic illustration of a host computer connected to a data storage system.

While the present invention may be used in any storage device, the preferred embodiment environment is in a RAID storage device. FIG. 3 shows a computer system 20 having a host computer 22 connected to a data storage system 24 via an I/O interface bus 26. Host computer 22 is a general purpose computer that can be configured, for example, as a server or workstation. Computer 22 has a visual display monitor 28, a central processing unit (CPU) 30, a keyboard 32, and a mouse 34. Other data entry and output peripherals may also be included, such as a printer, tape, CD-ROM, network interfaces, and so forth. In FIG. 3, the host computer 22 is coupled to a network 36 to serve data from the data storage system 24 to one or more clients (not shown).

The data storage system 24 holds user data and other information. In the preferred implementation, the data storage system 24 is a hierarchical RAID system that is capable of storing data according to different redundancy schemes. The host computer 22 provides an interface for an administrator to configure the memory space in the RAID system 24, run diagnostics, evaluate performance, and otherwise manage the RAID storage system.

Figure 4:
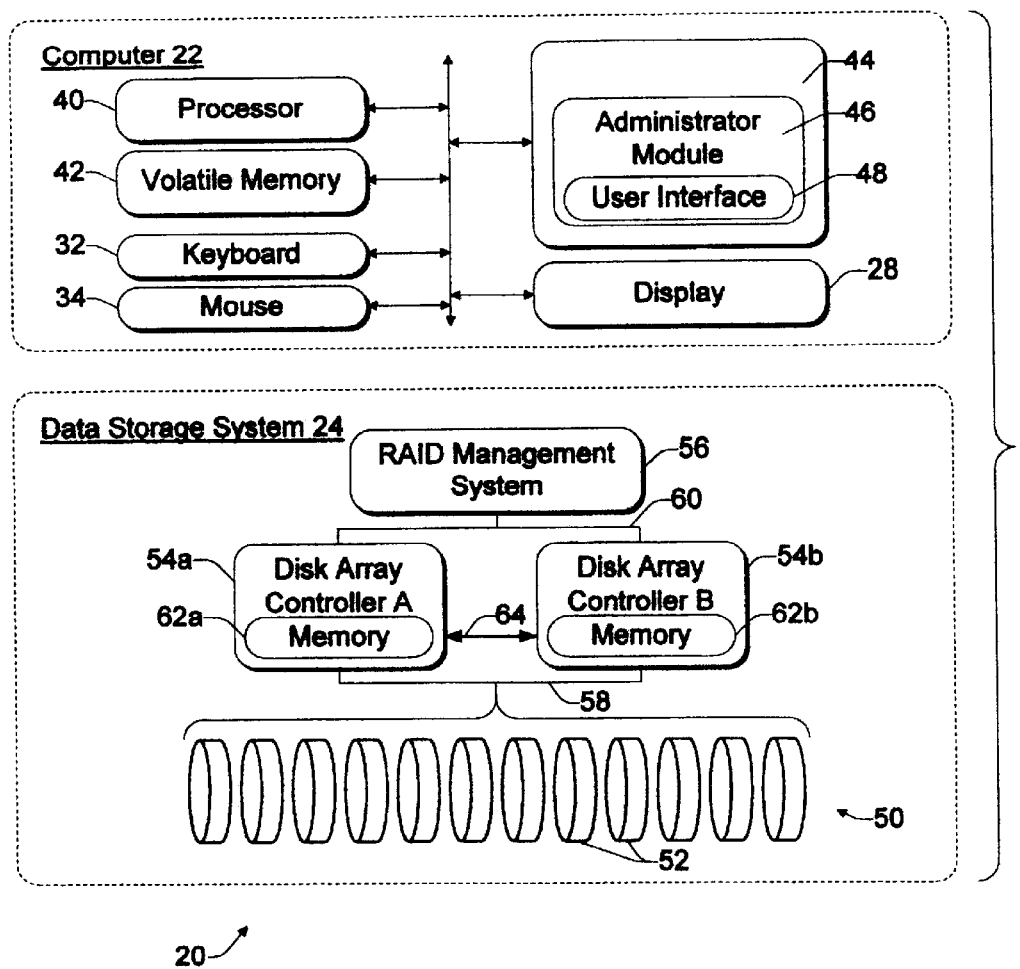
FIG. 4 s a block diagram of the host computer and data storage system. The data storage system is illustrated as a hierarchic RAID system.

FIG. 4 shows the host computer 22 and data storage system 24 in more detail. The computer 22 has a processor 40, a volatile memory 42 (i.e., RAM), a keyboard 32, a mouse 34, a non-volatile memory 44 (e.g., ROM, hard disk, floppy disk, CD-ROM, etc.), and a display 28. An administrator module 46 is stored in memory 44 and executes on processor 40. The administrator module 46 provides management functions such as diagnostics, performance review, LUN arrangement analysis, and capacity analysis. The administrator module 48 supports a storage manager graphical user interface (UI) 48 that presents a visual interface on the display 28.

The data storage system 24 has a disk array 50 with multiple storage disks 52, a disk array controller 54, and a RAID management system 56. The disk array controller 54 is coupled to the disk array 50 via one or more interface buses 58, such as a small computer system interface (SCSI). The RAID management system 56 is coupled to the disk array controller 54 via an interface protocol 60. It is noted that the RAID management system 56 can be embodied as a separate component (as shown), or within the disk array controller 54, or within the host computer 22. The RAID management system 56 is preferably a software module that runs on the processing unit of the data storage system 24, or on the processor 40 of the computer 22.

The disk array controller 54 coordinates data transfer to and from the disk array 50. The disk array controller 54 has two identical controller boards: a first disk array controller 54a and a second disk array controller 54b. The parallel controllers enhance reliability by providing continuous backup and redundancy in the event that one controller becomes inoperable. The parallel controllers 54a and 54b have respective mirrored memories 62a and 62b. The mirrored memories 62a and 62b are preferably implemented as battery-backed, non-volatile RAMs (NVRAMs). Although only dual controllers 54a and 54b are shown and discussed generally herein, aspects of this invention can be extended to other multi-controller configurations where more than two controllers are employed.

The mirrored memories 62a and 62b store several types of information. The mirrored memories 62a and 62b maintain duplicate copies of a cohesive memory map of the storage space in disk array 50. This memory map tracks where data and redundancy information are stored on the disk, and where available free space is located. The view of the mirrored memories is consistent across the hot-plug interface, appearing the same to external processes seeking to read or write data.

The mirrored memories 62a and 62b also maintain a read cache that holds data being read from the disk array 50. Every read request is shared between the controllers. The mirrored memories 62a and 62b further maintain two duplicative copies of a write cache. Each write cache temporarily stores data before it is written out to the disk array 50.

One particular implementation of a mirrored memory dual controller for a disk storage system is described in U.S. Pat. No. 5,699,510, entitled "Failure Detection System for a Mirrored Memory Dual Controller Disk Storage System," which issued Dec. 16, 1997 in the names of Petersen et al. and is assigned to Hewlett-Packard Company. This patent is incorporated by reference for background information pertaining generally to dual controller disk storage systems.

Figure 5:
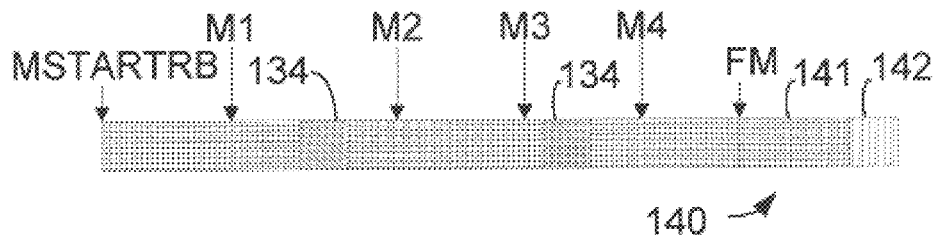
FIG. 5 is a pictorial representation of a block of data.

With the above description of the preferred environment, the details of the present invention can be described. Turning now to FIG. 5, the record marker will be described in more detail. It is known for a storage apparatus to receive host data and arrange the data into fixed size groups independent of the data structure. In the preferred embodiment, a RAID system, data is handled in Relocation Blocks (RB). While the data is handled in RBs, not all operations affect the entire RB. For example, if a user modifies only a portion of an RB, it is very desirable to only modify the portion of the RB that was affected. To decompress and entire RB, modify the affected portion, and then recompress the RB would create a significant performance degradation.

The update of the RB in place presents a problem when using traditional compression algorithms. Lossless adaptive compression algorithms build a history of the data as the data is compressed. When information is gathered during the compression process, that information is used to improve compression of the remainder of the record. Therefore, each byte of data compressed depends on all of the previous bytes of data in the record.

The preferred embodiment solves this problem by adding the record marker to indicate the beginning of different sections of the RB. The preferred embodiment places these markers every four sectors, where a sector is 512 bytes, of uncompressed data.

For decompression of a particular RB, the firmware points the decompression engine in the general area of the record and the specialized decompression algorithm searches for the record marker—which is mixed in with the random data patterns from compression operations—and begins the decompression operations at the exact byte location required.

Figure 6:
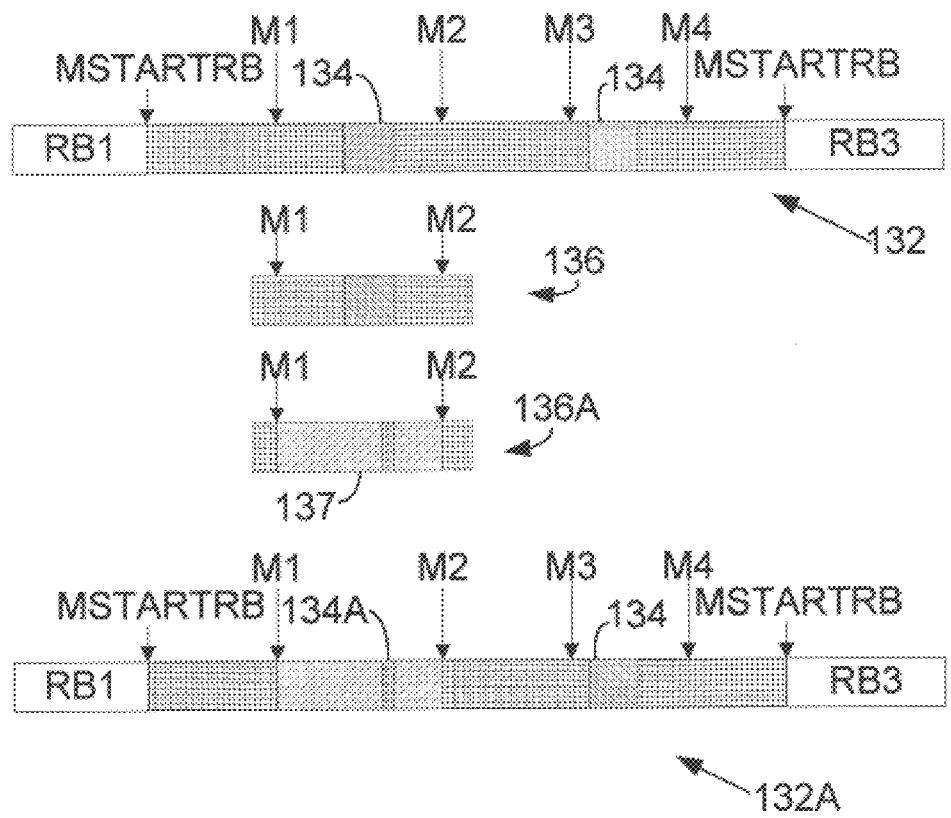
FIG. 6 shows three data blocks as stored in a storage device and how the expansion joints allow for the compressed data to be updated in accordance with the present invention.
Figure 7:
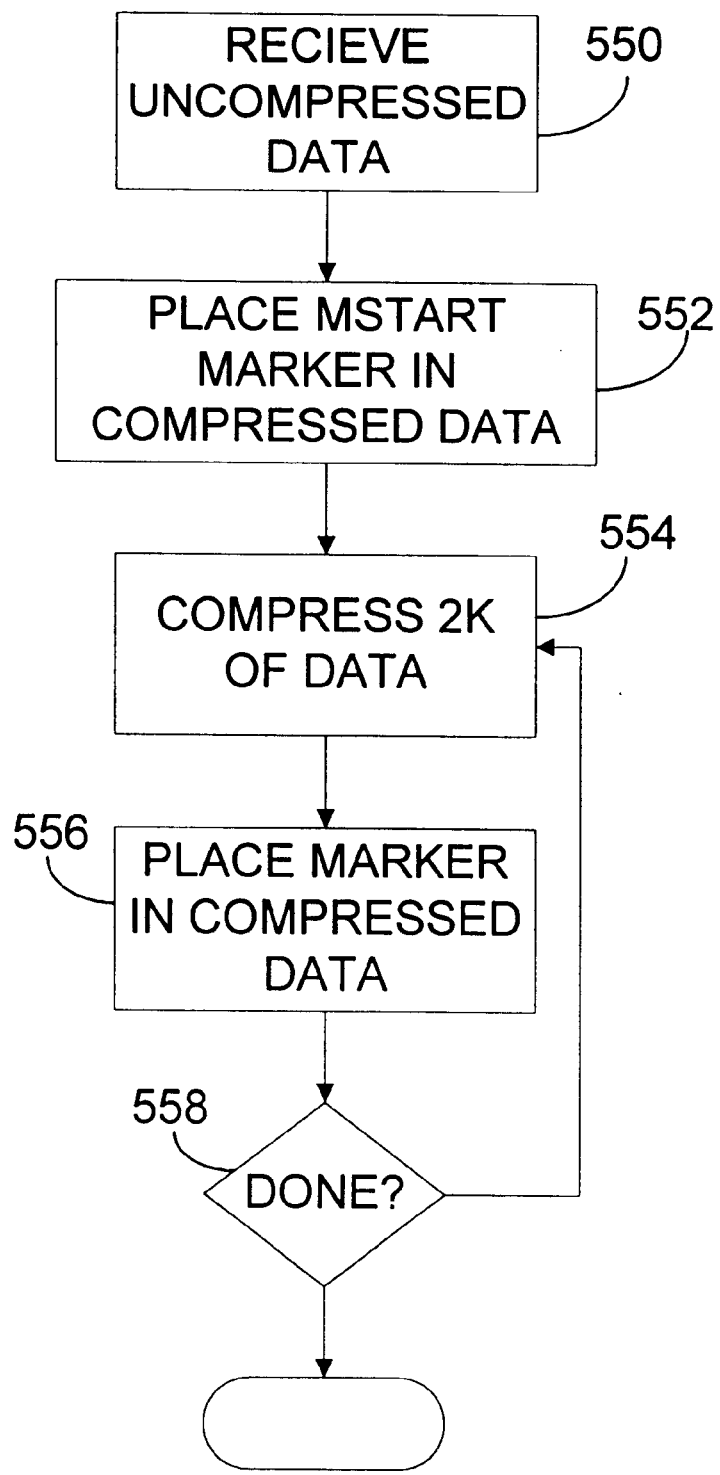
FIG. 7 is a flow diagram showing a high level representation of the compression process.

Referring to FIG. 6, three RBs are shown (RB1–RB3) with RB2 (132) shown in greater detail. At the start of every RB is a Mstart record marker. This record marker indicates the start of a new RB. Additional record markers are added and shown as M1–M4. In the preferred embodiment, these record markers are placed every 2K bytes of uncompressed data. Also shown are expansion joints 134, which are described in more detail below. In practice, uncompressed data is sent from the host (22) to the storage system (24). The host may have operating system (OS) information embedded in the uncompressed data, however, the storage system generally does not make use this OS information. Referring to FIG. 7, the storage system 48 first places (552) an Mstart record marker to indicate that a new RB is starting. The data is compressed (554) using a lossless data compression algorithm. After the compression engine has compressed 2K bytes of uncompressed data, the M1 record marker is placed (556) in the compressed data stream. This record marker indicates to the decompressor that it can start decompressing at this point. Thus, for example, if the compression engine is using an LZ type compression, then at a record marker boundary, the dictionary is reset; likewise, if the compression engine is using an arithmetic compression, the probability table is reset; other compression algorithms may require their own method to insure that decompression can start at this point. The compression engine continues (558) to compress the uncompressed data. Again after compressing (554) 2K byte of uncompressed data, the M2 record marker is placed (556) in the compressed data. This process continues until the original RB has been compressed.

Figure 8:
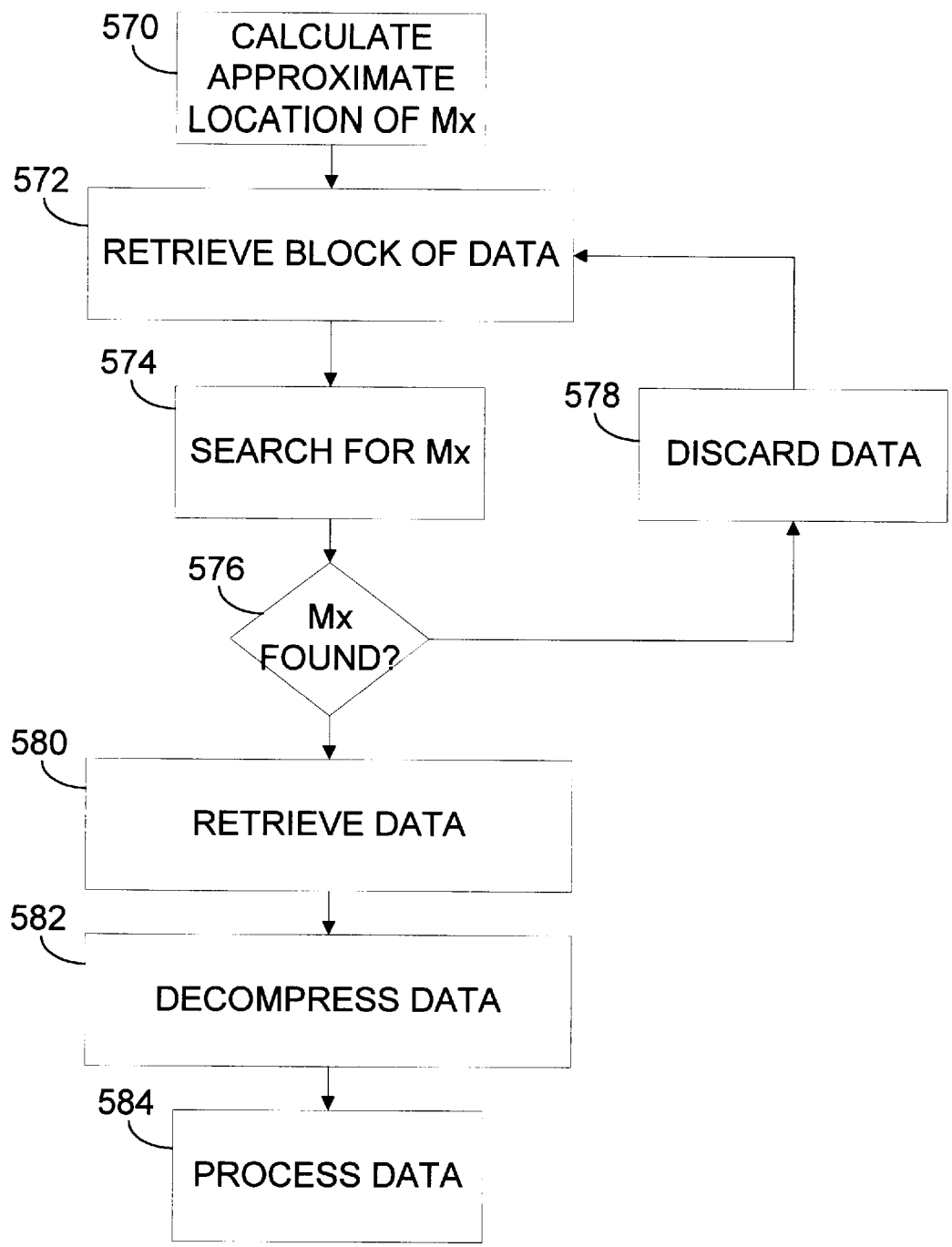
FIG. 8 is a flow diagram showing a high level representation of the decompression process.

Referring to FIG. 8. For decompression of a particular portion of an RB starting at record marker Mx, the storage system determines the approximate location of the Mx record marker (570). A block of data is retrieved from the storage devices (50) starting at the approximate location (572). The specialized decompression algorithm searches (574+576) for the Mx record marker—which is mixed in with the random data patterns from compression operations—and begins the decompression operations (580+ 582) at the exact byte location required.

As mentioned earlier, compressed data records do not have predictable compression ratios. This presents a problem for modifications made in place. An important aspect to the present invention is the support of expansion joints. Expansion joints allow compression records to expand slightly or shrink any amount. In the preferred embodiment, when the record is initially compressed, expansion joints are added at the end of each 4-sector block of physical storage space and consume about 10 percent of the total storage space. This causes additional disk space consumed by the expansion joints to remain constant regardless of the compression ratio.

Expansion joints are marked be inserting expansion joint meta-data markers into the compressed data stream. In the preferred embodiment, the expansion joint is a series of expansion joint markers in the compressed data stream. During decompression operation, whenever expansion joint is encountered, the decompressor skips the expansion joint markers and continues when compressed data is encountered.

With expansion joint, a merge operation consists of the following steps. When new data is added to a portion of the existing RB, the affected data must be read, modified and then written to the storage device. By way of an example, as shown in FIG. 6, the affected data is read between record markers M1 and M2. The system approximates the location of record marker M1 and passes it to the decompressor. The decompressor finds record marker M1 and then decompresses the data until record marker M2 skipping over the expansion joint markers 134. Data before record marker M1 is not be modified on the disk drive. The compression engine places the newly compressed data (137) behind record marker M1. In the present example, the newly compressed data required more space than the original data, therefore the remaining expansion joint (134A) is smaller than the original expansion joint (134). Finally, the result is written to disk as 132A shows. Similarly, if the newly compressed data had a higher compression ratio and therefore required less space to store, the expansion joint would expand.

As stated above, data is generally managed in discrete blocks of data (the RBs). When the host writes a portion of the RB, the portion the host did not write remains the format pattern. Thus, when the host reads the portion of the RB that was not previously written, it expects to receive the format pattern. However, the format pattern is quite repetitive and compresses well given an adaptive compression algorithm. This actually creates a problem when dealing with RBs that are only partially written. The problem comes in the merge operation. Any time the user writes real data over the format pattern, the newly compressed data would be much larger than the compressed format pattern. The size of the expansion joints are intended to soak up the small deviations resulting from merge operations, not fundamental shifts in the type of data stored.

This invention resolves this problem by placing a Format Marker at the start of each block of data inside the RB. The format marker directs the decompressor to ignore the actual data decompressed and simply provide the format pattern. That way, when the record is initially compressed, similar data can be used to create the compressed record. The similar data is based on the data actually written by the host. The compression record that results from the compression of the similar data can be thought of as a placeholder for future data that is to be merged.

FIG. 5 shows an RB in detail. As before, there is an Mstart record marker and M1–M4 record markers placed regularly throughout the RB. There are also expansion joint markers 134 shown. This figure shows how the format marker can used to indicate that the following block is not completely used. In particular, block 140 is only partially used. A portion (141) contains data, and a portion 142 should be interpreted as format pattern. Thus, instead of placing an M5 record marker, there is placed a format marker (FM). With the aid of FIG. 9, FM 143 is followed by additional information (144) indicating which sectors are in use and which should be interpreted as format pattern. Each bit in 144 indicates if a particular sector is valid data or invalid data. Here, sectors 1–3 contain valid, compressed data while sector 4 contains invalid compressed data. Thus, when the decompression engine receives this block, it interprets FM 143 and the following information 144 to properly decompress the data. When the decompression engine reaches sector 4, the decompression engine ignores the invalid data stored in sector 4 and instead inserts format data into the uncompressed data stream.

While FIG. 9 represents this information using 4 bits, any number of bits could be used. In the preferred embodiment, an eight bit number follows the FM, but only four of the eight bits are used. The number of bits, as is the block size and RB size, is determined by the system requirements.

The above description described how, by using embedded meta-data, lossless data compression can be used in a storage device. As mentioned above, decompression may start at a marker (either a record marker and a format marker). To accomplish this depends on the type of data compression used. If a dictionary based compression method such as LZW is used, the at a marker, the compression engine must flush the dictionary at a marker; an RLE type compression must place a control word at this boundary. Arithmetic encoding must reset the probability tables. Other compression schemes may require their own method.

FIG. 10 shows a high level diagram of a compression system in accordance with the present invention. Compression block 95 represents a lossless data compression method, either a presently known method or one not yet created. Output from the compressor is further processed by Meta-Data Insertion block 96. Meta-Data Insertion block post processes the data stream from the compressor in order to add the necessary markers. It may also allocate free space by inserting a stream of expansion marker.

FIG. 11 is a representation of a small data segment that is stored on a data storage device. Each block represent a multi-bit value; D blocks represent compressed data, M blocks indicate the start of a compressed record marker, F blocks represent free space marker. The alignment of the compressed data relative to the represented code words does not matter. For example, the compression engine could take some of the first "D" (121) and some of the next "D" and interpret it as any compressed code that makes sense to the compression scheme. However, the alignment of the "M" and "F" markers is important. Because when searching for markers during decompression, the alignment must be known so that the proper search for the "M" and "F" markers can take place without knowledge of the compressed data structure. Any arbitrary alignment is possible provided that decompression process knows the alignment used.

Figure 12:
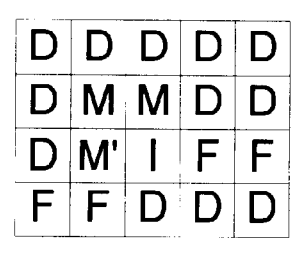

Because there is no provision that the compressed data not include binary output that would mimic a meta-data marker, something must be done to avoid falsely detecting a marker in the compressed data. Detecting any false marker and subsequently marking the false markers with another marker accomplishes this. In FIG. 12 there is some data that mimics a marker (M'). When this occurs, a special marker called "I" (ignore) is added to indicate that the (M') is not a valid marker that it is indeed valid compressed data. When the decompression pre-process engine engine senses the "I", it passes the the false marker (M') to the decompression engine and discards the "I".

It should be noted that while the M and I meta-data may have any value, numbers with all zeros or all ones should generally be avoided because those codes are common in compressed data streams.

If a code based compression scheme, such as LZW is used, then it is possible to reserve code words to use as the meta-data. For example, in an LZW compression scheme, one could reserve three code words: FD, FE and FF to use as meta-data. The code word FF is reserved to signal to the compressor that it is a meta-data for the expansion joint as described above. Similarly, the code word FE is the record marker. A second byte just after the FE is used to encode the record marker number. The Format Marker (FM) is represented by the reserved code word FD. As with the record marker, the format marker is followed by a byte used to encode the validity of the data.

Figure 13:
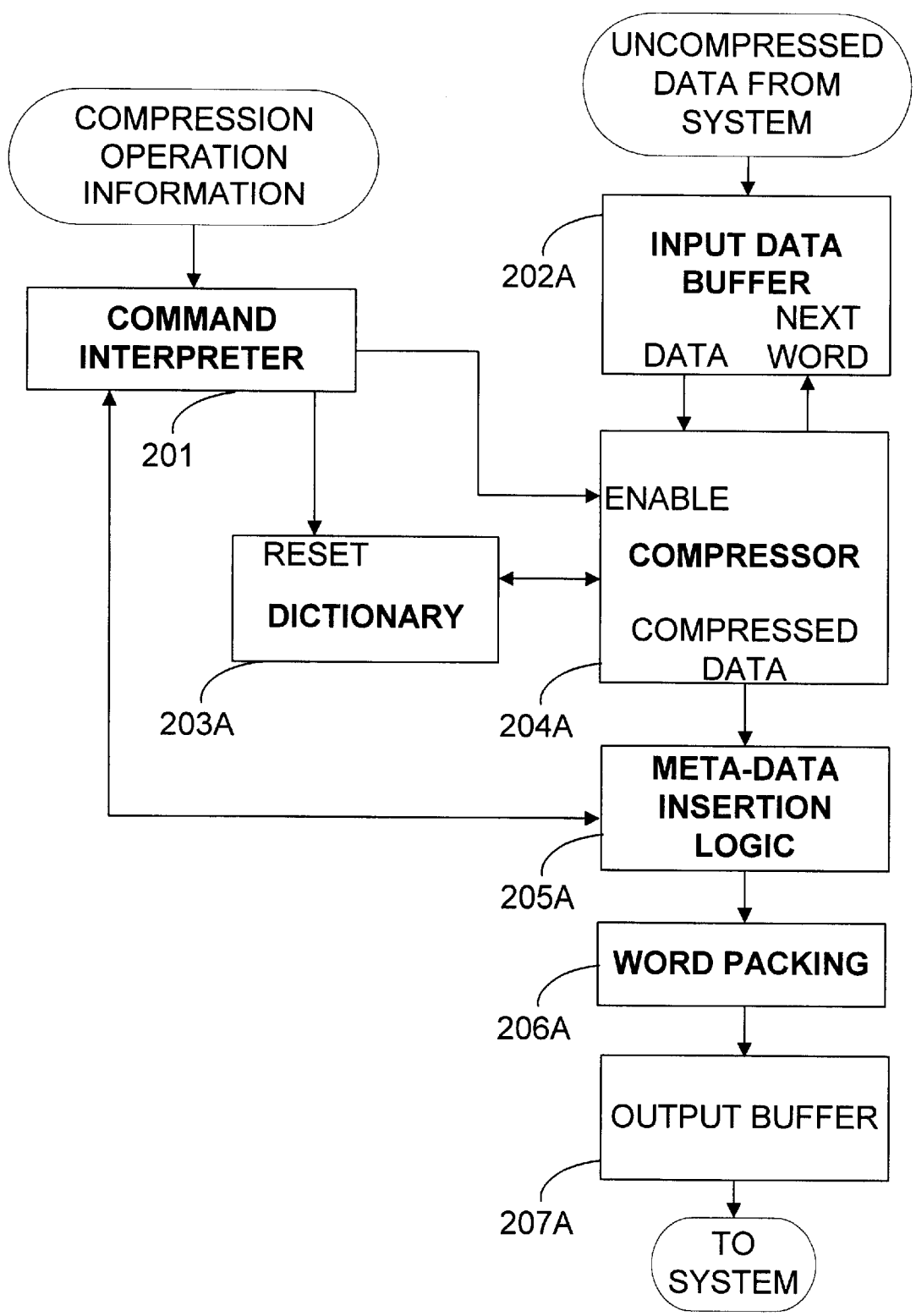
FIG. 13 shows the compression operation in a block diagram format.

Referring to FIG. 13 a block diagram showing an implementation using a dictionary based compression method, such as LZW, is shown. Command Interpreter 201 receives commands from the system and controls the operation of the compression engine. Command Interpreter 201 may be implemented in software, firmware, or hardware using a state machine or combinatory logic. The system must provide data to the input data buffer 202A, handle compressed data from the output buffer 207A and provide instructions to the Command Interpreter 201. In turn, Command Interpreter 201 controls the operation of the compression and decompression process. At the start of a compression cycle, Command Interpreter 201 resets Dictionary 203A and then enables Compressor 204A. Compressor 204A compresses data received from input Data Buffer 202A and outputs compressed data. Compressor 204A updates the contents of Dictionary 203A in accordance with the compression method. To achieve high performance, Compressor 204A may be implemented in hardware; however, it may also be implemented in software, firmware, or a combination of any of the above. Compressor 205A outputs compressed data to Meta Data Insertion Logic 205A. Under direction of Command Interpreter 201, Meta Data Insertion 205A inserts the meta-data (Record Marker, Expansion Joints, and Format Marker, Ignore Marker, if needed)) into the compressed data stream. As described above, some meta-data requires the Command Interpreter 201 to reset dictionary 203A. Data form Meta Data Insertion Logic 205A is packed (206A) and output (207A) to the system for further processing.

Figure 14:
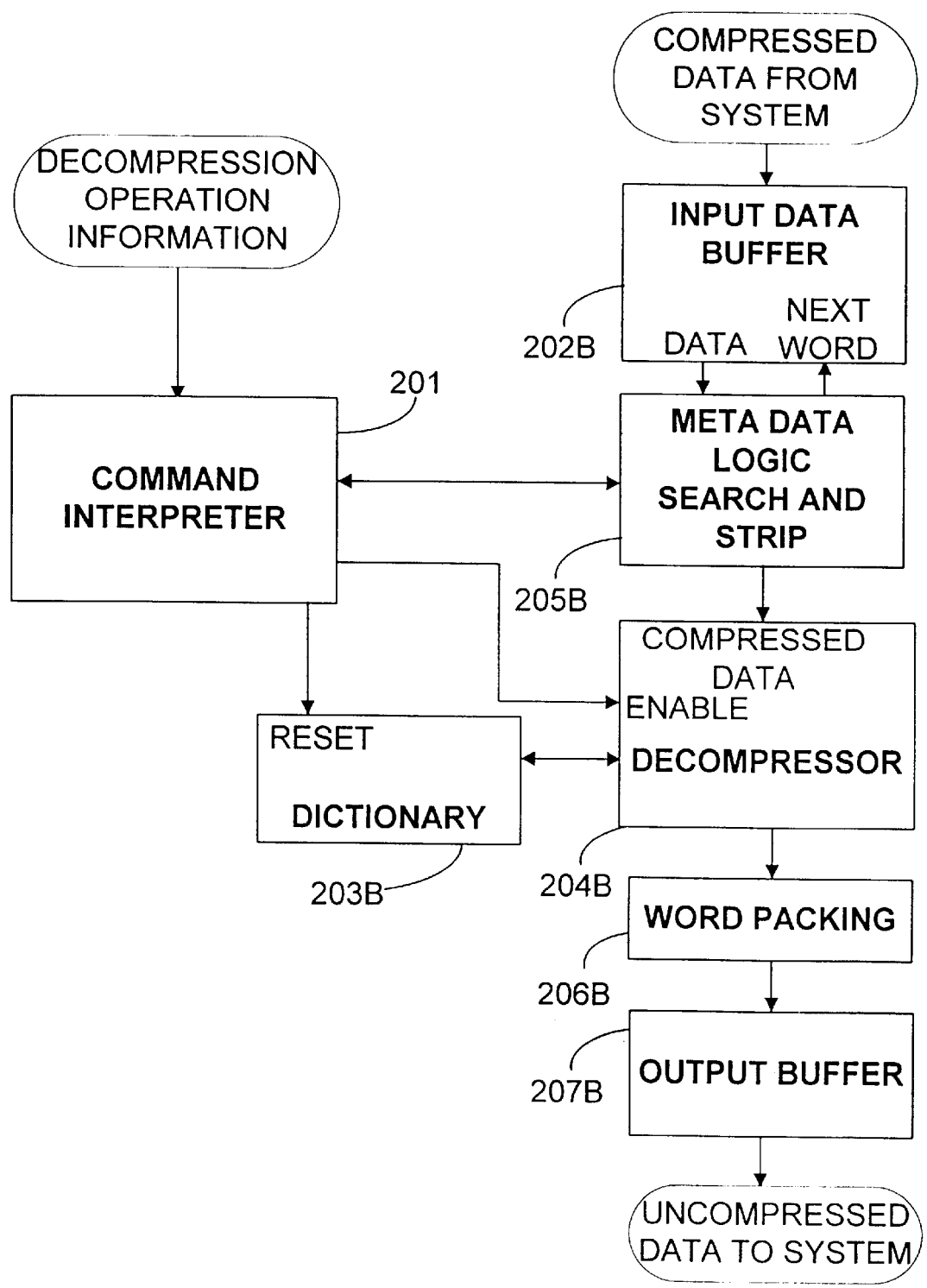
FIG. 14 shows the decompression operation in a block diagram format.

FIG. 14 shows a similar block diagram for decompression. As before, Command Interpreter 201 receives commands from the system and controls the operation of the decompression engine. The system must provide compressed data to the input data buffer 202B, handle uncompressed data from the output buffer 207B and provide instructions to the Command Interpreter 201. In turn, Command Interpreter 201 controls the operation of the decompression process. The compressed data passes through the Meta Data logic 205B where all meta-data is striped from the data stream and passed to Command Interpreter 201. Meta data is interpreted by Command Interpreter 201. For example, each time a Record Marker is encountered, Command Interpreter 201 must reset Dictionary 203B. After all meta-data has been striped from the compressed data, the compressed data is passed to Decompressor 204B. Decompressor 204B decompresses compressed data and outputs uncompressed data. Decompressor 204B updates the contents of Dictionary 203B in accordance with the decompression method. To achieve high performance, Decompressor 204B may be implemented in hardware; however, it may also be implemented in software, firmware, or a combination of any of the above. Decompressor 20B outputs uncompressed data to Word Packing 206B and finally to output Buffer 207B.

Although the preferred embodiment of the invention has been illustrated, and that form described, it is readily apparent to those skilled in the art that various modifications may be made therein without departing from the spirit of the invention or from the scope of the appended claims.

What is claimed is:

1. A method for compressing data, said method comprising the steps of:

receiving uncompressed data;

placing a first meta-data marker in the compressed data, the first meta-data marker indicating the beginning of a data record;

compressing a portion of the uncompressed data into the compressed data using a compression engine;

inserting a second meta-data marker in the compressed data, the second meta-data marker indicating the beginning of a decompressible data block; and inserting a third meta-data marker in the compressed data, the third meta-data marker indicating that a portion of the compressed data is to be ignored.

2. The method of claim 1 further comprising the step of:

adding an expansion joint meta-data marker in the compressed data.

3. The method of claim 2 further comprising the steps of:

searching in the compressed data for the first meta-data marker;

decompressing the compressed data with a decompression engine;

if the second meta-data marker is found in the compressed data, then resting the decompression engine; and if the expansion joint meta-data marker is found in the compressed date, then instructing the decompression engine to skip the expansion joint meta-data marker.

4. The method of claim 2 further comprising the step of:

merging additional data into the compressed data.

5. The method of claim 4 wherein the step of merging further comprising the steps of;

estimating a location of the additional data in the compressed data:

searching in the compressed data for the second meta-data marker;

merging the additional data with the compressed data;

if the merged data requires more space, then decreasing the expansion joint meta-data marker; and if the merged data requires less space, then increasing the expansion joint meta-data marker.

6. A method for compressing data, said method comprising the steps of:

receiving uncompressed data;

placing a first meta-data marker in the compressed data, the first meta-data marker indicating the beginning of a data record;

compressing a portion of the uncompressed data into the compressed data using a compression engine;

inserting a second meta-data marker in the compressed data, the second meta-data marker indicating the beginning of a decompressible data block; and adding an ignore meta-data marker whenever the compression engine outputs a code equal to the first meta-data marker or the second meta-data marker.

7. A method for compressing data, said method comprising the steps of:

receiving uncompressed data;

placing a first meta-data marker in the compressed data, the first meta-data marker indicating the beginning of a data record;

compressing the uncompressed data into the compressed data using a compression engine:

after a predefined amount of the uncompressed data is compressed, inserting a second meta-data marker in the compressed data, the second meta-data marker indicating the beginning of a decompressible data block;

after a predefined amount of the compressed data is created, adding a third meta-data marker in the compressed data, where the third meta-data marker identifies an expansion joint in the compressed data, and adding an ignore meta-data marker whenever the compression engine outputs a code equal to the first meta-data marker, the second meta-data marker or the third meta-data marker.

8. The method of claim 7 further comprising the step inserting a fourth meta-data marker in the compressed data, the fourth meta-data marker indicating that a portion of the compressed data to be ignored.

9. A storage system comprising:

a storage media; and a controller connected to the storage media, the controller further comprising:

a compression engine;

a dictionary connected to the compression engine;

a meta-data insertion logic arranged to receive compressed data from the compression engine;

a command interpreter for controlling the compression engine and the meta-data insertion logic, the command interpreter instructing the meta-data insertion logic to insert a first meta-data marker in the compressed data, where the first meta-date marker indicates the beginning of a data record; after a predefined amount of uncompressed data is compressed, the command interpreter instructs the meta-data insertion logic to insert a second meta-data marker in the compressed data, the second meta-data marker indicating the beginning of a decompressible data block; after a predefined amount of the compressed data is created, the command interpreter instructs the meta-data insertion logic to insert a third meta-data marker, where the third meta-data marker identifies an expansion joint in the compressed data, the command interpreter resetting the dictionary when the first meta-data marker or the second meta-data marker is inserted.

10. The storage system as claimed in claim 9 wherein the controller further comprises:

a decompression engine connected to the dictionary;

a mete-data extraction logic connected to the decompression engine, for extracting meta-data from compressed data; and the command interpreter resetting the dictionary when the meta-data extraction logic extracts the first meta-data marker or the second meta-data marker.

11. A method for decompressing data, said method comprising the steps of:

searching the compressed data for a first meta-data marker, the first meta-data marker indicating the beginning of a data record;

decompressing the compressed data with a decompression engine;

if a second meta-data marker is found in the compressed date, then resting the decompression engine; and if a third meta-data marker is found in the compressed data, then instructing the decompression engine to skip the third meta-data marker.

12. The method of claim 11 further comprising the step of:

estimating B location of the first meta-data marker in the compressed data.

13. The method of claim 11 further comprising the step of:

if a fourth meta-data marker is found in the compressed data, then instructing the decompression engine to decompress a next code of the compressed data.

* * * * *